(12) United States Patent
Hamba et al.

(10) Patent No.: US 6,710,144 B2
(45) Date of Patent: Mar. 23, 2004

(54) PROCESS FOR PRODUCING OLEFIN POLYMER

(75) Inventors: Masashi Hamba, Ichihara (JP); Kazuki Wakamatsu, Sodegaura (JP); Tomoaki Gotou, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/972,952

(22) Filed: Oct. 10, 2001

(65) Prior Publication Data

US 2002/0128407 A1 Sep. 12, 2002

(30) Foreign Application Priority Data

Mar. 9, 2001 (JP) .................................. 2001-066317

(51) Int. Cl.7 .............................. C08F 4/02; C08F 4/642; C08F 210/16
(52) U.S. Cl. .................. 526/170; 526/129; 526/130; 526/160; 526/901; 526/908; 502/117; 502/119
(58) Field of Search ................................. 526/160, 908, 526/129, 130, 170, 901

(56) References Cited

U.S. PATENT DOCUMENTS

| 4,166,167 A | * | 8/1979 | Bye et al. ............... 526/142 |
| 4,405,495 A | | 9/1983 | Lee et al. |
| 4,721,763 A | * | 1/1988 | Bailly et al. ............. 526/88 |
| 5,461,123 A | | 10/1995 | Song et al. |
| 5,587,439 A | * | 12/1996 | DiMaio ................... 526/142 |
| 6,187,883 B1 | | 2/2001 | Satoh et al. |

FOREIGN PATENT DOCUMENTS

| EP | 0 811 638 A2 | 12/1997 |
| JP | 8-169915 | 7/1996 |
| JP | 10-60019 | 3/1998 |

* cited by examiner

Primary Examiner—Roberto Rabago
(74) Attorney, Agent, or Firm—Sughrue Mion, PLLC

(57) ABSTRACT

There is provided a process for producing an olefin polymer, which comprises a step of polymerizing an olefin in a gas phase in the presence of a homogeneous solid catalyst having a content of particles having a particle size of not more than 180 $\mu$m of not more than 15% by weight based on 100% by weight of the total weight of the homogeneous solid catalyst.

5 Claims, No Drawings

PROCESS FOR PRODUCING OLEFIN POLYMER

FIELD OF THE INVENTION

The present invention relates to a process for producing an olefin polymer, according to which process a lumped matter having a sheet-like form can hardly be formed on an inner wall surface of a gas phase polymerization reactor.

BACKGROUND OF THE INVENTION

In recent years, olefin polymers have generally been produced according to a gas phase polymerization using a fluidized bed reactor equipped with a plate having many pores (hereinafter referred to as "gas distribution plated") at the bottom of the reactor. Such a gas phase polymerization has a problem that powder particles, particularly small particles, which form a fluidized bed, adheres to an inner wall surface of the reactor owing to static electricity generated by friction between particles in the fluidized bed reactor, or between particles and the inner wall surface of the reactor, thereby causing insufficient removal of heat of the polymerization reaction, and as a result, a lumped matter having a sheet-like form is easily formed on the inner wall surface of the reactor. When the lumped matter having a sheet-like form accumulates to increase its weight, the lumped matter peels off from the wall, and as a result, there are risks of closing an outlet of the olefin polymer and filling the pores of the gas distribution plate.

As a method for solving the above-mentioned problem, there are known:

(1) a method as disclosed in, for example, JP-A 10-60019 wherein a static electricity-removing agent such as an amine-containing antistatic agent is added to the fluidized bed, thereby inhibiting generation of the static electricity; and (2) a method as disclosed in, for example. JP-A 8-169915, wherein a low-frequency high-pressure sonic wave is generated in the reactor, thereby forcibly peeling off the lumped matter having a sheet-like form adhering on the inner wall surface of the reactor.

However, these methods cannot satisfactorily solve the above-mentioned problem.

Accordingly, at present, it is obliged to stop the operation periodically to remove the lumped matter having a sheet-like form adhering on the inner wall surface of the reactor for avoiding the above-mentioned problem.

Considering said gas phase polymerization from a viewpoint of an olefin polymerization catalyst, an olefin polymer produced using a homogeneous solid catalyst, which catalyst comprises a combination of a transition metal compound (such as a metallocene complex and a non-metallocene complex) with an organoaluminum compound (such as an aluminoxane) and/or a boron compound (such as tri(n-butyl)ammonium tetraxis(pentafluoro)borate), and which catalyst has become used in recent years, has a lower melting point than that of an olefin polymer produced using a heterogeneous solid catalyst, which catalyst comprises a combination of a transition metal catalyst component (such as a titanium compound) with an organoaluminum compound (such as trlethylaluminum). Therefore, the former gas phase polymerization using a homogeneous solid catalyst is remarkably liable to cause the above-mentioned problem.

SUMMARY OF THE INVENTION

It is an object of the present invention to provide a process for producing an olefin polymer with no problem as mentioned above.

The present inventors have undertaken extensive studies to find a process for producing an olef in polymer with no problem as mentioned above. As a result, it has been found that the above-mentioned problem can be solved by subjecting an olefin to gas phase polymerization in the presence of a homogeneous solid catalyst having a specific particle size, and thereby the present invention has been obtained.

The present invention provides a process for producing an olefin polymer, which comprises a step of polymerizing an olefin in a gas phase in the presence of a homogeneous solid catalyst having a content of particles having a particle size of not more than 180 $\mu$m of not more than 15% by weight based on 100% by weight of the total weight of the homogeneous solid catalyst.

DETAILED DESCRIPTION OF THE INVENTION

A homogeneous solid catalyst for polymerizing an olefin used in the present invention is not particularly limited. As said catalyst, (i) a catalyst comprising a combination of a transition metal compound (such as a metallocene complex and a non-metallocene complex) with an organoaluminum compound (such as an aluminoxane) and/or a boron compound (such as tri(n-butyl)ammonium tetraxis(pentafluoro) borate), and (ii) a catalyst produced by supporting or impregnating the aforementioned compounds with or on a solid particle such as porous silica can be exemplified. Particularly preferred is a catalyst produced by supporting a metallocene complex and methylaluminoxane with porous silica.

The olefin polymer produced by the process in accordance with the present invention means not only an olefin polymer produced by polymerizing an olefin in the presence of the foregoing homogeneous solid catalyst, but also an olefin polymer produced by polymerizing an olefin in the presence of a catalyst, which catalyst is hereinafter referred to as "pre-polymerization catalyst", and the pre-polymerization catalyst can be produced by polymerizing a small amount of an olefin in the presence of the foregoing homogeneous solid catalyst. The homogeneous solid catalyst used in the present invention also means said pre-polymerization catalyst.

The homogeneous solid catalyst and pre-polymerization catalyst used in the present invention may be used in combination with a known co-catalyst or a known activity accelerator. As the co-catalyst and the activity accelerator, those disclosed in U.S. Pat. Nos. 4.405,495 and 4,508,842 can be exemplified. Specific examples of the co-catalyst are organoaluminum compounds and specific examples of the activity accelerator are organosilicon compounds.

The catalyst used in the present invention has a low content of fine particles, namely, a catalyst having a content of particles having a particle size of not more than 180 $\mu$m of not more than 15% by weight, preferably not more than 10% by weight, and more preferably not more than 5% by weight based on 100% by weight of the total weight of the homogeneous solid catalyst.

A preferred catalyst used in the present invention has a content of particles having a particle size of not more than 180 $\mu$m of not more than 15% by weight, and has a content of particles having a particle size of not more than 125 $\mu$m of not more than 3% by weight, preferably not more than 1% by weight, and more preferably 0% by weight based on 100% by weight of the total weight of the homogeneous solid catalyst.

The catalyst having the above-defined particle size can be prepared by, for example, (i) classifying a catalyst having a large content of fine particles to decrease contents of particles having a particle size of not more than 180μm and those having a particle size of not more than 125μm, or (ii) using a carrier having a low content of fine particles, with or on which carrier the catalyst components are supported or impregnated.

A gas phase polymerization method used in the present invention is not particularly limited, and may be a conventional one. For example, said olefin polymerization can be carried out using a gas phase fluidized bed reactor in the presence of an effective amount of the catalyst and in the absence of any catalyst poison such as moisture, oxygen or carbon dioxide under conditions of temperature and pressure capable of polymerizing an olefin. Specific methods are disclosed in, for example, U.S. Pat. Nos. 4,482,687, 4,558,790 and 4,994,534.

A gas phase polymerization pressure in the present invention is that in which an olefin can exist as a gas phase in a reactor. The pressure is usually from 0.1 to 5.0 MPa, and preferably from 1.5 to 3.0 MPa. A gas phase polymerization temperature can be suitably selected depending upon conditions such as catalysts used, pressure and a kind of the olefin used, and is usually from 50 to 110° C. A gas flow velocity in a reactor during polymerization is usually from 10 to 100 cm/s, and preferably from 20 to 70 cm/s. In the process in accordance with the present invention, additives such as a fluidizing co-agent and a static electricity-removing agent may be used.

As the above-mentioned gas phase fluid bed reactor, there can be exemplified a single reactor and a multi-stage reactor composed of several reactors arranged in series. The reactor's type such as its shape is not limited. The reactor may be provided with a stirring blade or not.

As an olefin used in the present invention, there can be exemplified ethylene and α-olefins. The α-olefins are, for example, those having 3 to 8 carbon atoms. Specific examples thereof are propylene, 1-butene and 1-hexene.

An olefin polymer obtained in the present invention contains, for example, polyethylene, homopolymers and copolymers of the α-olefin, and copolymers of ethylene and the α-olefin. Specific examples thereof are polypropylene, ethylene-1-butene copolymer and ethylene-1-hexene copolymer.

EXAMPLE

The present invention is explained with reference to the following Examples and Comparative Example, which are not intended to limit the scope of the present invention.

COMPARATIVE EXAMPLE 1

(1) Preparation of Catalyst Component

In a 5 litter-volume four necked flask purged with nitrogen, 3 liters of toluene and 407 g of silica, which silica was obtained by heat-treating silica, a trade mark of SYLOPOL 948 (pore volume=1.61 ml/g, specific surface area=296 m²/g), manufactured by Davison, at 300° C. under nitrogen atmosphere, were placed, and cooled to 5° C. with an ice bath. To the resulting mixture, 997 ml of a toluene solution of polymethylaluminoxane, a trade mark of PMO-s, manufactured by Tosoh-finechem, (Al concentration=3.1 mol/liter) was dropwise added over 85 minutes. After completion of the addition, the content was stirred at 5° C. for 30 minutes, thereafter heated to 95° C., and stirred at 95° C. for 4 hours. A temperature of the resulting mixture was lowered to 60° C., a supernatant solution thereof was filtered, and then the solid compound remaining in the flask was washed 3 times with each 4 liters of toluene.

To the solid compound, 4 liters toluene was added, and resulting mixture was stirred and heated to 40° C. Thereafter, 13.6 g (32.5 mmol) of ethylenebis(indenyl) zirconium dichloride was added thereto, followed by stirring at 40° C. for 2 hours. A supernatant solution of the resulting mixture was filtered, and then the solid compound remaining in the flask was washed 2 times with each 4 liters of hexane. The solid compound was dried under reduced pressure to obtain 553 g of a catalyst component having flowability. As a result of an elementary analysis, the catalyst component was found to contain 4.1 mmol/g of Al and 55 μmol/g of Zr.

(2) Preparation of Pre-polymerization Catalyst

In a 210 litter-volume autoclave equipped with a stirrer, which had been purged with nitrogen, 83 liters of a butane solution of triisobutylalumlnum (triisobutylaluminum concentration 3.9 mmol/liter) was charged. Successively, a suspension obtained by suspending 290 g of the catalyst component obtained in the above (1) in a hexane solution of triisobutylaluminum (containing 175 mmol of triisobutylaluminum) was added thereto.

The resulting mixture was heated to 50° C., thereafter, 65 NL of hydrogen was put therein, and successively ethylene was introduced therein so as to obtain 0.39 MPa in terms of gas phase pressure in the reactor, thereby initiating polymerization. During the polymerization, a temperature was kept at 50° C., and ethylene was supplied to make the total pressure in the reactor constant. The polymerization was continued for 2 hours.

After completion of the polymerization, the reaction mixture was purged of ethylene, butane and hydrogen gas, and successively the remaining solid in the reactor was dried under reduced pressure at room temperature for 3 hours, thereby obtaining a pre-polymerization catalyst, which had 63.6 g of polymerized ethylene per 1 g of the catalyst component used.

As a result of measuring a content of fine particles in said pre-polymerization catalyst using a laser diffraction size distribution measuring apparatus of HELOS & RODOS SYSTEM, manufactured by SYMPATEC Co., it was found that the pre-polymerization catalyst was 246 μm in its weight average particle size, and contained 19.8% by weight of particles having a particle size of not more than 180 μm, and 4.7% by weight of particles having a particle size of not more than 125 μm.

(3) Gas Phase Polymerization

Using a gas phase polymerization reactor having a volume of 0.78 m³ and an inner diameter of 0.5 m, copolymerization of ethylene and 1-butene were carried out in a manner such that the pre-polymerization catalyst mentioned in the above (2) and triisobutylaluminum were continuously fed in the reactor at rates of 43 g/hr and 50 mmol/hr, respectively, under conditions of the total pressure of 2.0 MPa, polymerization temperature of 70° C. and gas flow velocity of 34 cm/s, while continuously feeding ethylene, 1-butene, hydrogen and nitrogen in the reactor to make the gas composition constant during the polymerization.

A production rate of the copolymer was found to be from 13 to 16 kg/hr. At a 12-hour lapse of time after initiation of the polymerization, a lumped matter having a sheet-like form began to form remarkably. At last, it became impossible to draw out the lumped matter from the reactor, and at a 24-hour lapse of time after initiation of the polymerization, it was obliged to stop the polymerization.

EXAMPLE 1

The pre-polymerization catalyst obtained in Comparative Example 1 was classified to remove fine particles in the pre-polymerization catalyst under nitrogen gas atmosphere, thereby obtaining a catalyst, which was 255 μm in its weight average particle size, and which had a content of particles having a particle size of not more than 180 μm of 12.0% by weight, and a content of particles having a particle size of not more than 125 μm of 0.9% by weight. Using the resulting catalyst, ethylene and 1-butene were copolymerized in a manner similar to that of Comparative Example 1 (3).

A production rate of the copolymer was found to be from 13 to 22 kg/hr. Although this rate was higher than that in Comparative Example 1, almost no lumped matter formed even at a 46-hour lapse of time after initiation of the polymerization, and therefore the operation could be steadily continued.

EXAMPLE 2

(1) Preparation of Catalyst Component

Comparative Example 1 (1) was repeated, except that the silica, toluene solution of polymethylaluminoxane and ethylenebis(indenyl)zirconium dichloride were used in each amount of 394 g, 946 ml and 13.1 g, respectively, thereby obtaining 515 g of a catalyst component having flowability. As a result of elementary analysis, the catalyst component was found to contain 4.1 mmol/g of Al and 55 μmol/g of Zr.

(2) Preparation of Pre-polymerization Catalyst

Comparative Example 1 (2) was repeated, except that a suspension containing 320 g of the catalyst component of the above (1) was used, 70 NL of hydrogen was put, ethylene was introduced so as to obtain 0.39 MPa in terms of gas phase pressure in the reactor, and the polymerization was continued for 10.0 hours, thereby obtaining a pre-polymerization catalyst, which had 95.3 g of polymerized ethylene per 1 g of the catalyst component used.

The resulting pre-polymerization catalyst was classified to remove fine particles contained therein under nitrogen gas atmosphere, thereby obtaining a pre-polymerization catalyst, which was 269 μm in its weight average particle size, and which had a content of particles having a particle size of not more than 180 μm of 6.7% by weight, and a content of particles having a particle size of not more than 125 μm of 0% by weight.

(3) Gas Phase Polymerization

Ethylene and 1-hexene were copolymerized in a manner similar to that of Comparative Example 1 (3), except that 1-butene was replaced by 1-hexene, and the pre-polymerization catalyst of the above (2) freed from fine particles was supplied in a rate of 165 g/hr.

A production rate of the copolymer was found to be from 12 to 18 kg/hr, almost no lumped matter formed even at a 91-hour lapse of time after Initiation of the polymerization, and therefore the operation could be steadily continued.

What is claimed is:

1. A process for producing an olefin polymer, which comprises a step of polymerizing an olefin in a gas phase in the presence of a homogeneous pre-polymerization solid catalyst having a content of particles having a particle size of not more than 180 μm of not more than 15% by weight based on 100% by weight of the total weight of the homogeneous pre-polymerization solid catalyst, wherein the homogeneous pre-polymerization catalyst is supported on a silica particle.

2. The process for producing an olefin polymer according to claim 1, wherein the homogeneous solid catalyst has a content of particles having a particle size of not more than 180 μm of not more than 15% by weight, and has a content of particles having a particle size of not more than 125 μm of not more than 3% by weight.

3. The process for producing an olefin polymer according to claim 1, wherein the homogenous solid catalyst comprises a metallocene complex.

4. The process for producing an olefin polymer according to claim 1, wherein the olefin comprises ethylene and an α-olefin.

5. The process for producing an olefin polymer according to claim 1, wherein the silica particle is a porous silica particle.

* * * * *